United States Patent [19]

Kubo

[11] Patent Number: 4,721,423
[45] Date of Patent: Jan. 26, 1988

[54] CHUCK

[75] Inventor: Haruaki Kubo, Higashi Osaka, Japan

[73] Assignee: Daishowa Seiki Kabushiki Kaisha, Osaka, Japan

[21] Appl. No.: 25,602

[22] Filed: Mar. 13, 1987

[30] Foreign Application Priority Data

Oct. 7, 1986 [JP] Japan .................. 61-154146[U]
Oct. 7, 1986 [JP] Japan .................. 61-154147[U]

[51] Int. Cl.$^4$ ............................................. B23B 31/04
[52] U.S. Cl. ........................... 409/234; 279/1 N; 279/103
[58] Field of Search ............ 409/234, 232; 279/1 ME, 279/1 N, 9, 41 R, 69, 101, 102, 103; 408/239 A

[56] References Cited

U.S. PATENT DOCUMENTS

| 3,521,896 | 7/1970 | Matsumoto | 279/102 |
| 4,021,051 | 5/1977 | Toyomoto et al. | 409/234 |
| 4,379,667 | 4/1983 | Yoshimoto et al. | 279/1 N |
| 4,630,980 | 12/1986 | Kubo | 279/1 N |
| 4,657,454 | 4/1987 | Migita et al. | 409/234 |
| 4,660,840 | 4/1987 | Mizoguchi | 279/9 R |

FOREIGN PATENT DOCUMENTS

| 23894 | 10/1969 | Japan | 279/1 N |
| 184610 | 11/1982 | Japan | 279/1 N |

Primary Examiner—Gil Weidenfeld
Assistant Examiner—Daniel W. Howell
Attorney, Agent, or Firm—Koda and Androlia

[57] ABSTRACT

A chuck allowing to mount a cutting tool on the spindle of a machine tool. The chuck includes an ahead projecting chuck cylinder provided on the one side of a chuck body in a mated fashion to each other, and a tightening rotary sleeve mounted through needle rollers outside the chuck sleeve, in addition, slits configured in the top end part of the chuck cylinder, wherein the rotation of the tightening rotary sleeve causes the slits to contract so that a cutting tool is gripped.

13 Claims, 22 Drawing Figures

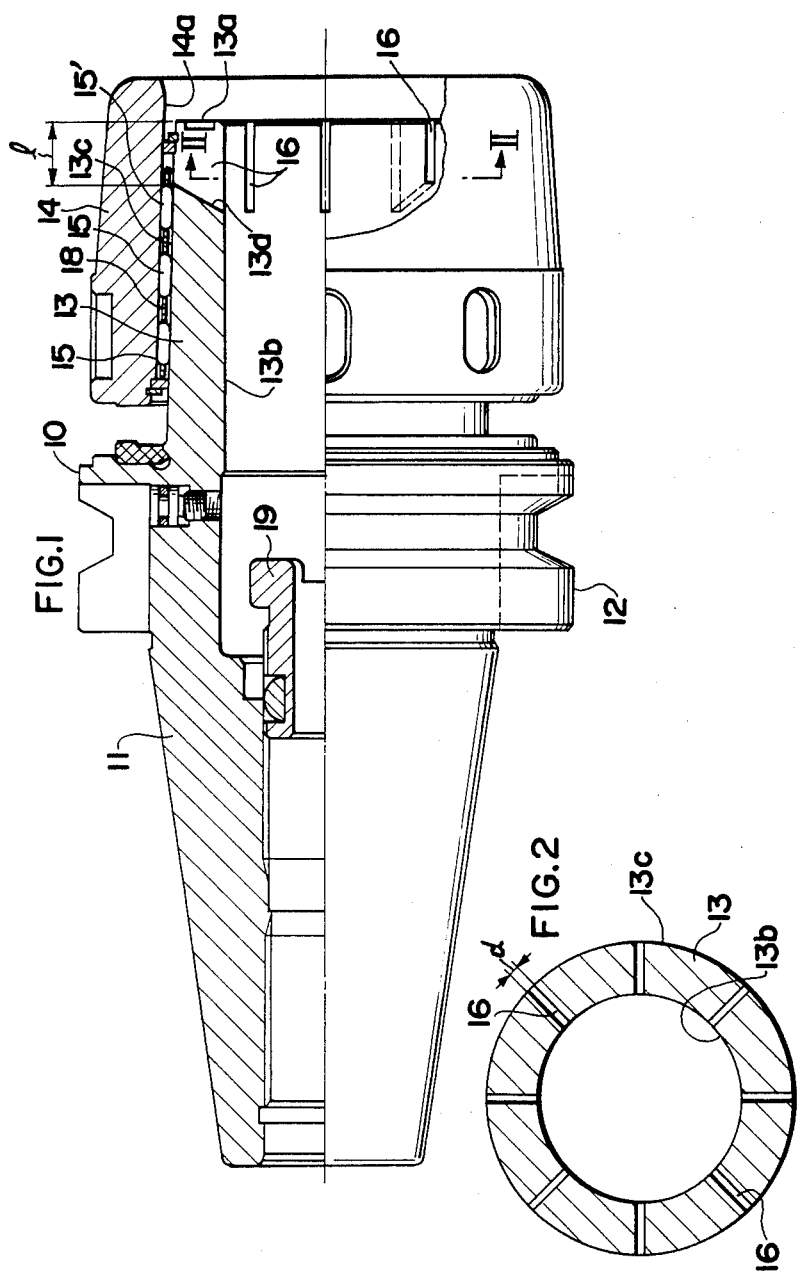

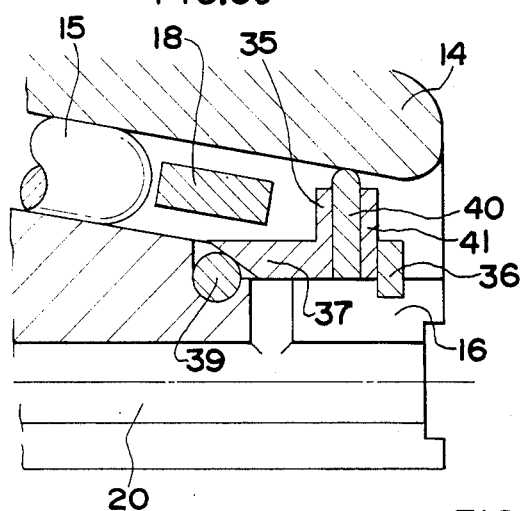
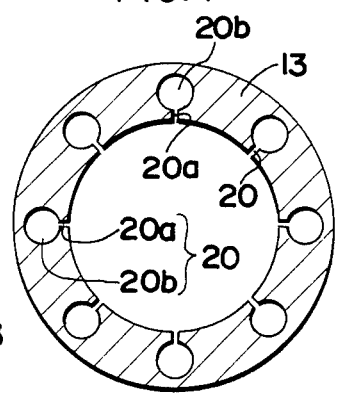
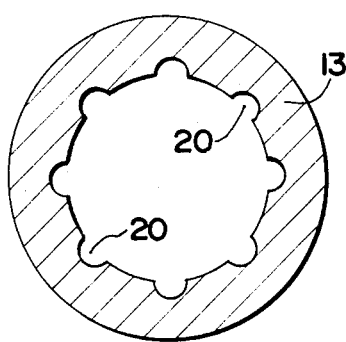

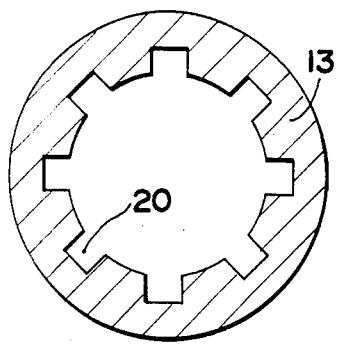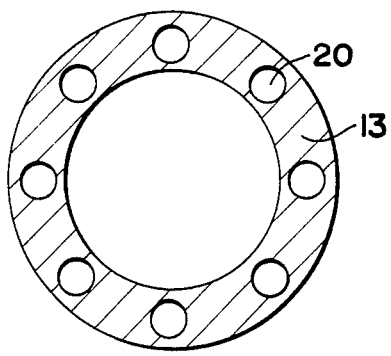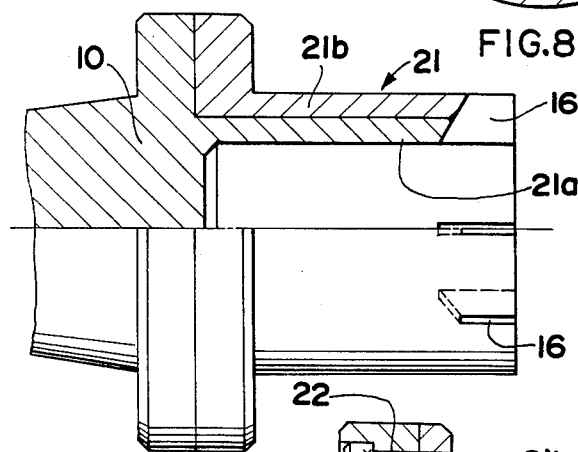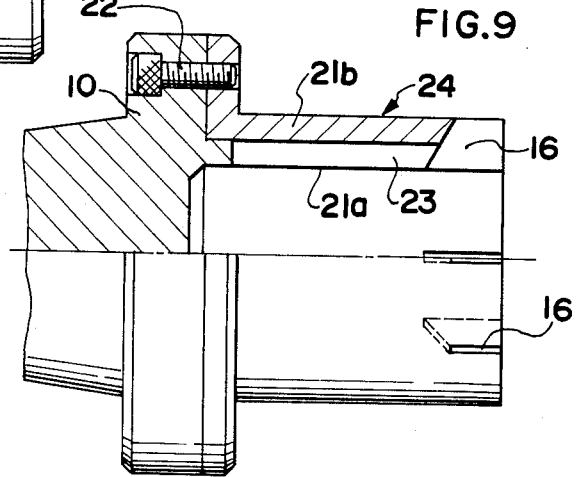

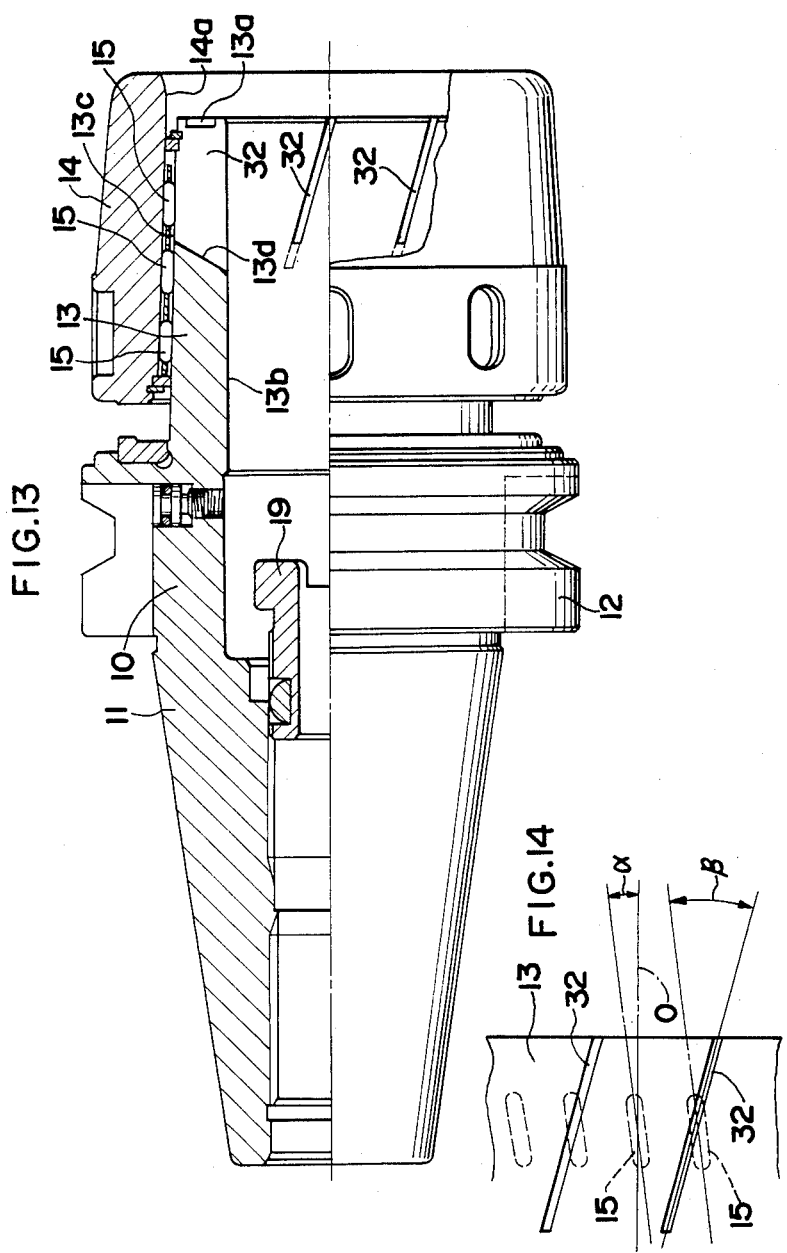

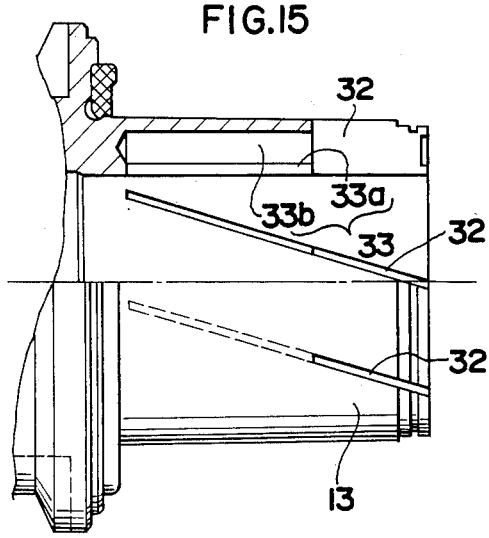
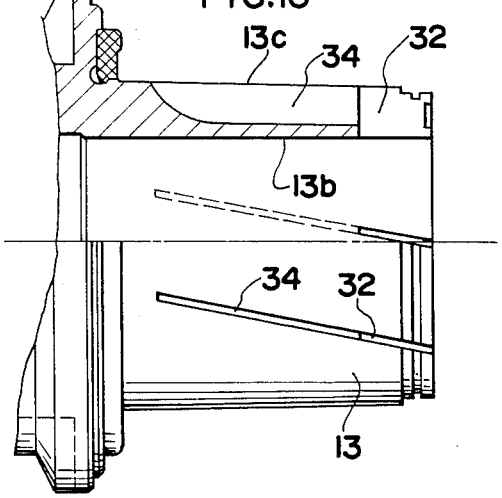

CHUCK

BACKGROUND OF THE INVENTION AND STATEMENT OF THE RELATED ART

The present invention relates to a chuck for gripping a cutting tool such as a drill, an end mill or the like, and more particularly to such a chuck incorporating needle rollers.

With respect to the above-mentioned chuck, a needle roller type of chuck has been already known as apparant from the disclosure in Japanese Utility Model Examined Publication No. SHO 41-23987. That type of chuck of the prior art, as shown in FIG. 19, comprises a chuck body 1, a chuck cylinder 2 projecting ahead from the one side of the chuck body 1 in a mated manner, and having its external peripheral surface tapered ahead, a tightening rotary sleeve 3 having an internal peripheral surface tapered ahead in correspondance with the aforesaid external peripheral surface, wherein the rotary sleeve is fitted outside the chuck cylinder, and many needle rollers 4 interposed between the cylinder 2 and the sleeve 3 so as to revolve spirally with relation to the external peripheral surface of the chuck cylinder 2.

The chuck cylinder 2, into which a cutting tool T is inserted, is structured so as to be contracted by the depression of the needle rollers 4 on the external peripheral surface, thereby gripping a cutting tool.

However this prior art has a problem; for the purpose of holding firmly a cutting tool particularly for milling which receives rather much resistance, it is necessary to increase the rigidness and intensity of the chuck cylinder by thickening the wall thereof. In doing so, the chuck cylinder 2 becomes difficult to be contracted, i.e. to grip the cutting tool securely.

In view of the above-mentioned problem of the prior chuck, the applicant of the present invention has previously filed, at the Japanese Patent Office on Mar. 19, 1982, an application with respect to another chuck preceded a chuck of the present invention, which is disclosed in Utility Model Umexamined Publication No. 58-143107 open to the public on Sept. 27, 1983. That chuck, as illustrated in FIG. 20, includes a chuck cylinder 2 extending from the side of a chuck body 1 in a mated manner, which is provided with chuck grooves 5 arranged at regular intervals consisting of axially extending slots 5a open to the internal peripheral surface of the chuck cylinder 2, and axially extending middle holes 5b communicating with said slots 5a. Other structure are identical to that of the above described prior art, and are represented by the same numerals.

In the structure of the above-mentioned chuck, the chuck cylinder 2 is provided with thinner walls 6 at regular intervals in the circumference, so that it can grip the cutting tool somewhat firmly through the contraction of the thinner walls 6 in case the thickness of the chuck cylinder 2 is a large size. Nevertherless, in the chuck having such structure, a problem remains unsolved that it is impossible to obtain a sufficient contraction amount particularly at the top end section of the chuck cylinder, i.e., it is impossible to apply force sufficient for gripping a cutting tool to the top end section. The cause of the above-mentioned disadvantage is considered as follows; In spite of the configuration of the thinner walls 6 in the top end section of the chuck cylinder 2, the top end part 6' of the cylinder 2 is not depressed directly by the needle roller 4 during the tightening operation and so the rigidity of the wall of the top end part 6' is kept. Besides, the aforesaid depression of the needle roller 4 causes the diameter of the opening of the top end part 6' to enlarge as shown in FIG. 20 by chain line, because a part of the depression force is transferred from the contracted section of the chuck cylinder 2, and absorbed in the top end part 6'. Therefore the force for gripping a tool is lowered remarkably at the top end part of the chuck cylinder.

SUMMARY OF THE INVENTION

As described above, an insufficiency of gripping force in the prior art chuck cylinder is because of the rigidity of the chuck cylinder wall. Accordingly it is the first object of the present invention to overcome this problem in the prior art, and to provide a chuck which is not influenced by the rigidity of the chuck cylinder.

The second object of the present invention is to provide a chuck which has a favorable effect of contraction, i.e. can grip a tool surely by lessening smoothly the diameter of the opening of the top end part of the chuck cylinder.

The third object of the present invention is to provide a chuck which can exert a more effect of the depression of needle rollers on the top end part of a chuck cylinder in proportion to the wall thickness of the chuck cylinder so that the contraction of the top end part thereof can be increased, and then a deep cutting tool such as an end mill can be gripped surely without the occurance of vibration, directly by way of a collet.

The fourth object of the present invention is to provide a chuck which can obtain more contraction of the top end part of the chuck cylinder, and which can tighten a tightening rotary sleeve by relative less force.

BRIEF DESCRIPTION OF THE DRAWINGS

FIG. 1 is a partial longitudinal sectional view of a chuck embodying the present invention;

FIG. 2 is a traverse sectional view taken on the line II—II of FIG. 1;

FIG. 4 is a traverse sectional view taken on the line IV—IV line of FIG. 3a;

FIGS. 5 to 7 are traverse sectional views of the main parts of variations of the chuck cylinder according to the present invention;

FIGS. 8 to 12 are partial longitudinal sectional views of the main part of further embodiments.

FIG. 13 is a partial longitudinal sectional view of still further embodiment;

FIG. 14 is an enlarged view of the main part of the embodiment of FIG. 13;

FIGS. 15 to 16 are partial longitudinal sectional views of the main part of variations of the chuck cylinder according to the present invention.

DETAILED DESCRIPTION OF THE PREFERRED EMBODIMENTS

Figure 3A:
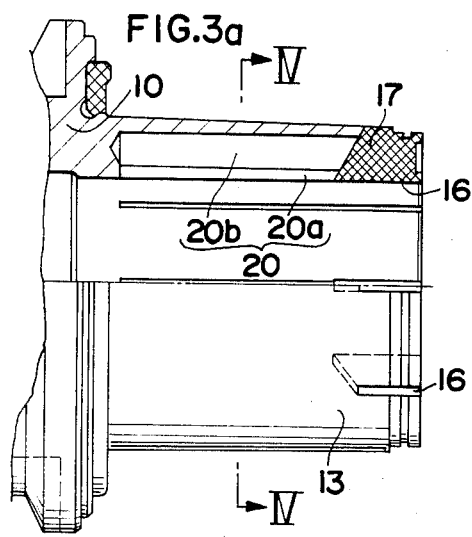
FIG. 3a, b and c are partial longitudinal sectional views illustrating the main part of other chucks embodying the present invention with certain parts omitted.

Referring first to FIG. 1 and 2, there is shown a chuck embodying the present invention. A chuck body 10 has a tapered shank part 11 and a flange part 12 for positioning. The tapered shank part 11 can be mounted detachably on the head of a spindle in a machining center (not shown), and the flange part 12 is extended concentrically above the the larger diameter end part of the tapered shank part 11. In addition, the chuck body 10 is provided mately with a chuck cylinder 13 projecting ahead from the one side thereof coaxially. The chuck cylinder 13 has a straight internal peripheral surface 13b corresponding either to the straight shank of a tool to be grasped or to a straight collet as well as an external peripheral surface 13c tapered ahead. The numeral 14 shows a tightening rotary sleeve to be fitted outside the chuck cylinder 13, which has a tapered internal peripheral surface 14a corresponding to the aforesaid external tapered peripheral surface 13c of the chuck cylinder 13. Between the rotary sleeve 14 and the chuck cylinder 13, there are interposed many needle rollers 15 which can revolve spirally with relation to the external peripheral surface of the chuck cylinder 13.

In the aforesaid chuck cylinder 13, there are configured slits 16 inward from the top face 13a thereof with such a length l that the needle rollers 15 are not allowed to be prevented from moving due to being caught in the slits. In detail, the length of the slits are limited to an axial distance between the top face 13a and such a position that the anterior pieces 15' of the needle rollers 15 at the position where the chuck sleeve 15 is loosened do not overlap the slits, or that in the case of overlapping each other the aforesaid anterior pieces 15' of the needle rollers are far away from the slits 16 during the tightening operation of the chuck sleeve 14. These respective slits are arranged at an angle of 45 degrees radially around the top end part of the chuck cylinder 13. In addition, for the purpose of extending the slits 16 such that the slits 16 do not overlap the needle rollers, it is preferred to lengthen the internal peripheral side of the slits 13d relative to the external side thereof as shown in FIG. 1.

Besides, as shown in FIG. 3a, the slits 16 are filled with soft elastic members 17 of silicon or the like for the purpose of preventing the entrance of chips and dust to the external pheripheral surface 13c of the chuck cylinder.

The aforesaid needle rollers 15 are held by retainer 18 while they are arranged in such a manner that the center lines thereof are inclined with relation to geometrical generating lines on the tapered external peripheral surface 13c of the chuck cylinder 13. Thus the needle rollers 15 roll and revolve spirally with relation to the chuck cylinder 13 and then move inwards while the chuck cylinder 13 gets elastically deformed and contracted so that it can grasp a tool.

In FIG. 1, the numeral 19 indicates a stopper for limiting the axial postition of the inner end of a tool to be inserted into the chuck cylinder 13. In the above-mentioned embodiment of the present invention, the chuck cylinder 13 is provided with lines of slits 16 extending radially and axially from the top end face 13a thereof, whereby the rotation of the tightening rotary sleeve 14 enables the chuck cylinder 13 to tighten-up through the needle rollers 15. In detail, the chuck cylinder 13 is elastically deformed in the area to which the needle rollers 15 depress directly while, in the area to which the needle rollers 15 depress undirectly, the chuck cylinder 13 is influenced by the corresponding depression force, so that the aforesaid slits 16 are contracted by the respective width d thereof, and then the top end part of the chuck cylinder is reduced to the less diameter of the opening thereof.

In the case of the wall of the chuck cylinder 13 being thicker, the depression force of the needle roller 15 influences more effectively on the top end part of the chuck cylinder, whereby the respective width d of the slits are contracted more effectively so that the gripping force (chucking force) with relation to a tool can be increased.

In the embodiment shown in FIG. 1, the chuck cylinder 13 provided with the slits 16 have the wall thereof defined in a solid form, so that the rigidity of the chuck cylinder 13 can be increased, whereas there is a possibility that the elastic-like deformation of the chuck cylinder is relatively somewhat insufficient.

For this reason, the chuck cylinder 13 may have the wall configured in a partial hollow form so as to elastically deform with ease. For example, as shown in FIG. 3a and 4, the chuck cylinder 13 is provided with chuck grooves 20 arranged at regular intervals consisting of axially extending slots 20a open to the internal peripheral surface of the chuck cylinder, and axially extending inner holes 20b communicating with said slots 20a. The above-mentioned chuck grooves 20 may be arranged on the identical faces with the slits 16 in a communicating manner with each other, otherwise on the radial faces between the respective slits 16.

Besides, the slits 16 are filled with soft elastic members 17 which exert no substantial influence on the elastic-like deformation of the chuck cylinder 13. These soft elastic members 17 effect to prevent the entrance of cutting chips and dust to the external peripheral surface 13c through the slits 16 configured in the chuck cylinder 13, and then the members 17 enable the needle rollers 15 to move smoothly without shaking.

Figure 3B:
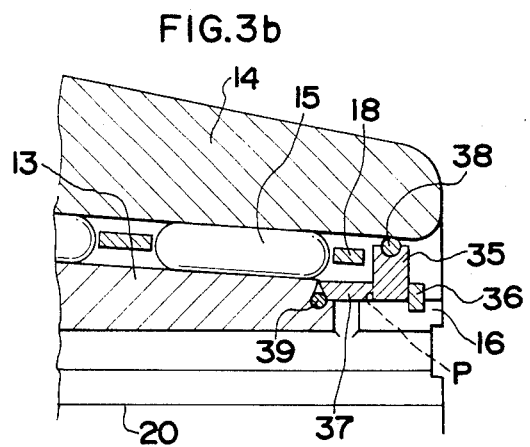

In addition, FIG. 3b shows means for sealing different from the soft elastic member mentioned above. In detail, a stopper ring 35 is fitted up into the chuck cylinder 13 by means of a snap ring 36 so as to prevent the detachment of the needle rollers 15. Further the stopper ring 35 is provided with a seal ring 37 extending in a lateral direction in the lower part thereof. The seal ring 37 is shaped with the stopper ring 37 in one mated form, or is connected to the stopper ring 37 of the separate member at the position shown by dashed line P. The slits 16 are covered with the seal ring 37 and stopper ring 35. The numeral references 38 and 39 show O-rings, which function as sealing between the external peripheral surface of the chuck cylinder 13 and the seal ring 37, and also between and the internal peripheral surface of the fastening rotary cylinder 14 and the seal ring 37, respectively adjacent to one another.

FIG. 3c also shows a modification of means for sealing described in FIG. 3b. In this modification, a flat elastic ring 40 is mounted on the stopper ring 35 with a spacer 41 instead of the above-mentioned O-ring. The flat elastic ring 40 is interposed pressedly between the stopper ring 35 and the spacer 41 so that it can be used steadily for a long time without a fear of detachment or abrasion. The embodiments shown in FIG. 3b and FIG. 3c have the same effects as in FIG. 3a, In particular, they have effects to prevent cutting chips and dust from entering the external peripheral surface 13c on which the needle rollers 15 move, and then to enable the needle rollers to move smoothly without shaking. In addition, since the seal ring 37 is provided with the stopper ring 35 in a mated or connected fashion, the fitting of the corresponding stopper ring 35 on the chuck cylinder 13 leads the seal ring 37 to be mounted on the chuck cylinder at the same time. Accordingly, the numbers of components and processes for fitting can be reduced.

In addition to the aforesaid configuration of the chuck groove, the chuck groove may be configured in a U sectional form as shown in FIG. 5, a rectangular form in FIG. 6, or middle hole in section in FIG. 7 so that the chuck cylinder 13 has the wall thickness varied.

As shown in FIG. 8, it is allowed that a chuck cylinder 21 consists of two different members, i.e. an inner cylinder 21a extending from a chuck body 10 in a mated fashion, and an outer cylinder 21b secured on the external peripheral surface of the inner cylinder 21a with shrinkage fit wherein slits 16 are configured at the respective top end part thereof. In addition, as shown in FIG. 9, it is allowed that the aforesaid outer cylinder 21b is fixed to the chuck body 10 with a bolt 22 while the outer cylinder is provided with slots 23 extending over the substantially full or partial length thereof, and the slits 16 also are configured at the top end part as described above.

Figure 10:
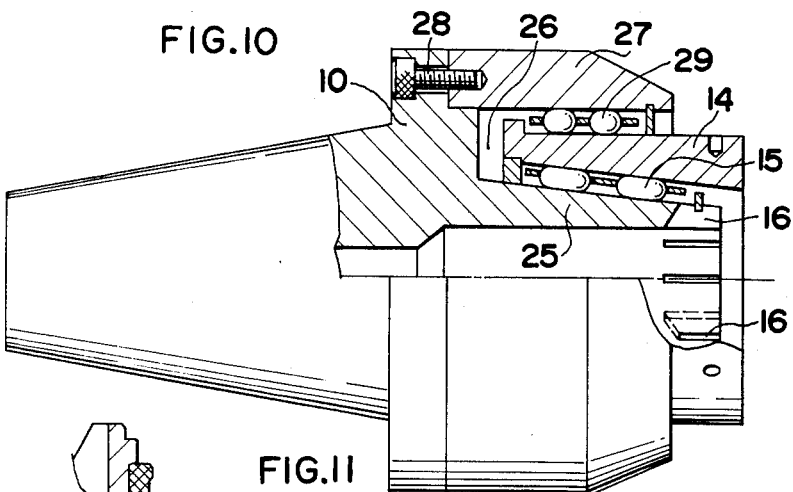

FIG. 10 shows another chuck provided with slits 16 in the top end part of a chuck cylinder 25. The chuck comprises a chuck cylinder 25 extending ahead in a mated fashion from a chuck body 10, a restricting ring 27 arranged axially with separation of the required distance 26 outside the chuck cylinder 25 and fixed with a bolt 28 or the like, and a tightening rotary sleeve 14 fitted into the space 26 between the chuck cylinder 25 and the restricting ring 27 while needle rollers 15, 29 revolving spirally are interposed in the respective gaps, whereby the sleeve 14 can rotate.

Figure 11:
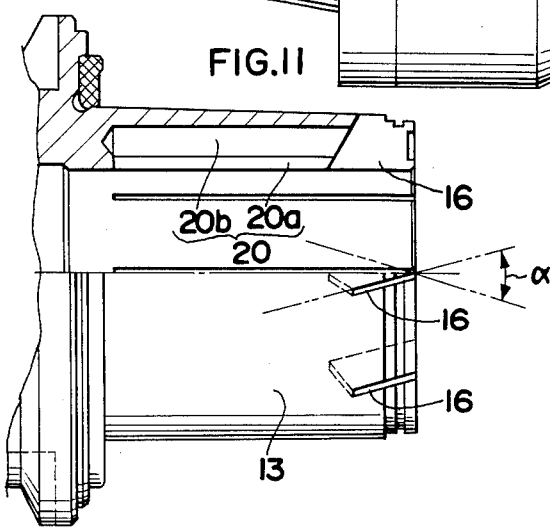

With respect to the slits 16 described above, they can be configured in the chuck cylinder 13 not only axially but also, as shown in FIG. 11, in a direction inclining with relation to the axis of the cylinder, particularly of an inclination angle $\alpha$ within every 15 degrees to the both sides of the axis. The effect of the inclined slits is substantially the same as that of the axially directed slits.

Figure 12:
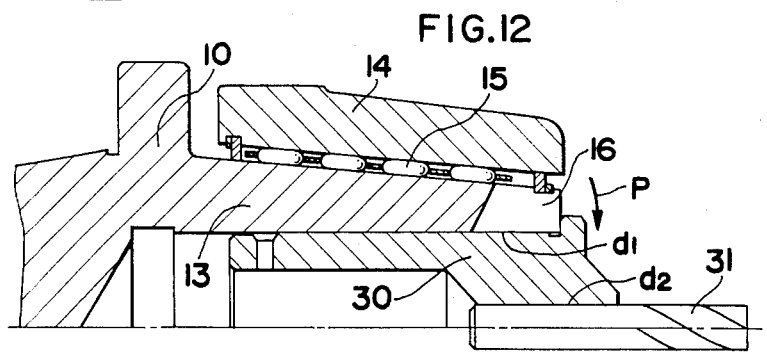

As shown in FIG. 12, in the case that the chuck cylinder 13 grips through a straight collet a cutting tool 31 in particular with a smaller diameter and shorter shank, the gripping force of the collet on the tool is related directly to the top end part rather than the corresponding part of the chuck cylinder 13 which is depressed directly by the needle rollers 15. Therefore the present invention enables the gripping force of the collet on the tool to increase remarkably so that the cutting tool is gripped surely.

Referring to FIG. 13, there is a still further chuck embodying the present invention. The chuck has structure identical partially to the one of the above-mentioned embodiment of FIG. 1 in that a chuck cylinder 13 is provided mately with a chuck cylinder 13 projecting and tapered ahead from the top end part of a chuck body 10, the chuck cylinder 13 has a tightening rotary sleeve 14 fitted outside, of which the internal peripheral surface is tapered ahead, and many needle rollers 15 are interposed between the chuck cylinder 13 and the the tighten rotary sleeve 14 at the desired angle of inclination, thereby revolving spirally with relation to the external peripheral surface of the chuck cylinder 13. In addition to the structure described above, the chuck has structure, as shown in FIG. 13 specifically in FIG. 14, different in that there are provided slits 32 at regular intervals of an angle of 45 degrees radially around the top end part of the chuck cylinder 13 while the slits 32 are arranged on the lines inclined by the desired angle $\beta$ (5 to 30 degrees) with relation to the axis of the needle rollers 15 which revolve at the spiral angle of $\alpha$ degrees relative to the geometric generated lines O on the external peripheral surface of the chuck cylinder 13.

The axial length of the aforesaid slits 32 is not always a special distance, but preferredly a distance from the top end face 13 to a position in front of the middle of the chuck cylinder 13 as shown in FIG. 13. Besides, it is preferred to lengthen the internal peripheral side 13a of the slits 32 relative to the external side thereof.

As described above, the slits 23 are arranged on lines inclined by the desired angle $\beta$ with relation to the axis of the needle rollers 15 in the above-mentioned embodiment of FIG. 13 and 14, in other words the slits 32 are arranged in such a manner as to be crossed in a diagonal way by the needle rollers 15, so that there is no occurrence of that the needle rollers 15 is caught in the slits 32, or that the needle rollers 15 become difficult to move due to the corners of the slits. Therefore the slits 32 never cause trouble against the tightening operation of the tightening rotary sleeve 14.

In the embodiment shown in FIG. 13 alike the one in FIG. 1, the chuck cylinder 13 except for the slits 32 have the wall thereof defined in a solid form, so that the rigidity of the chuck cylinder 13 can be increased, whereas there is a possibility that the spring-like deformation of the chuck cylinder is relative somewhat insufficient. For this reason, the chuck cylinder 13 may have the wall configured in a partial hollow form so as to deform springly with ease. For example, as shown in FIG. 15, the chuck cylinder 13 is provided with chuck grooves 33 arranged at regular intervals consisting of axially extending slots 33a open to the internal peripheral surface of the chuck cylinder 13, and axially extending inner holes 33b communicating with said slots 33a. The aforesaid chuck groove 33 may be configured in a U sectional form as shown in FIG. 5, a rectangular form in FIG. 6.

The above-mentioned relative long slits, which are arranged on inclined direction with relation to the axis of the needle rollers, shown in FIG. 13 may be employed also in the chuck cylinder shown in FIG. 8, 9 and 10, which the present invention includes obviously.

As shown in FIG. 16, the chuck groove 34 provided in the chuck cylinder 13 may be configured in a manner open to the external peripheral surface 13c thereof, on extension of the faces of slits 23 or on the faces inclined by the angle of $\beta$ degrees with relation to the former. The slits 32 may be filled with soft elastic member 17 for the purpose of preventing the entrance of chips and dust to the external surface of the chuck cylinder.

Figure 17:
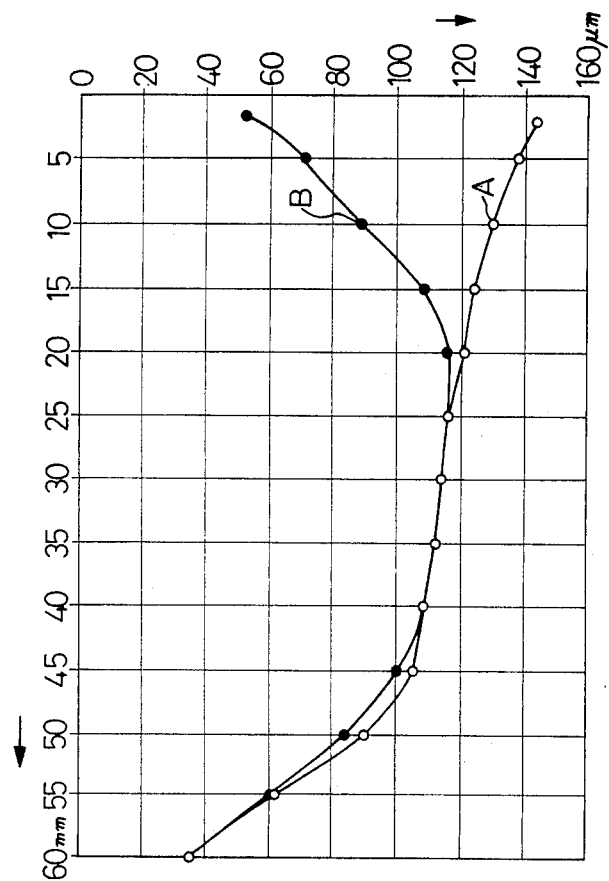
FIG. 17 is a graph showing the comparison of contraction amount between the chuck cylinders according to the present invention and the prior art.

FIG. 17 is a graph showing the comparison of contraction amount in the corresponding internal diameter between a chuck cylinder A according to the present invention and a chuck cylinder B according to the prior art.

Figure 20:
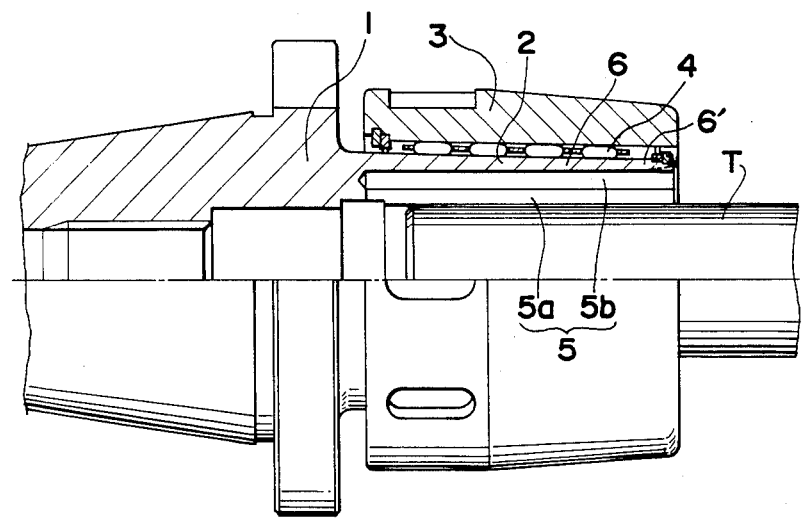

The chuck cylinder A is provided, as shown in FIG. 3 and 4, with the required axial length of slits 16 configured inward from the top face thereof as well as chuck grooves 20 arranged at regular intervals consisting of axially extending slots 20a and middle holes 20b, whereas the chuck cylinder B is provided only with the aforesaid chuck grooves 5, i.e. with no above-mentioned slits, as shown particularly in FIG. 20 with respect to a chuck of the prior art disclosed in Utility Model Unexamined Publication No. 58-143107 filed by the present application.

The graph is drawn up on the base of the date obtained by the experiment under the condition that the respective chucks 2, 13 are 67 mm long, of which the internal diameter is 32 mm, and the slits 16 of the present invention are 9 mm, in addition, that the respective rotary sleeves are movable axially up to 6.7 mm. (Note; the respective chuck cylinder do not grip a cutting tool.) The graph in FIG. 17, of which a vertical line shows contraction amount in the corresponding internal diameter and a horizontal line shows distance inward axially from the top end face of the respective chuck cylinders, indicates that the respective chuck cylinders of A and B are contracted similarly by the substantially same amount over the interval between the base end part and the above middle part thereof, in addition, that in front of the respective top end faces (in the top end parts) the chuck cylinder A of the present invention is contracted still more, i.e. the contraction amount is increasing, whereas the chuck cylinder B of the prior art is contracted less, i.e. the contraction amount is reducing.

In the case of using the straight collet 30 shown in FIG. 12, there arise a gap $d_1$ between the chuck cylinder and the collet while there arise a gap $d_2$ between the collet 30 and the cutting cutter 31. Accordingly it is assumed that the chuck cylinder do not grip the cutting tool 31 until filling up the added amount $(d_1+d_2)$ of the gaps. In other words, the gripping force of the chuck cylinder on the cutting tool is produced after filling up the above-mentioned the added amount of the gaps.

Thus the followings are apparant from the preceeding description;

With respect to the chuck cylinder B of the prior art, in the top end part thereof the practical contraction amount effective for gripping is gotten by substracting the aforesaid added amount of the gaps from the contraction amount (50 to 80 $\mu$m) shown in FIG. 17. The effective amount is slightly 5 to 45 $\mu$m, so that it is undesirable to gain a relatively great amount of gripping force.

On the other hand, with respect to the chuck cylinder A of the present invention, in the top end part thereof the practical contraction amount effective for gripping is as many as 90 to 100 $\mu$m according to the great contraction amount of 130 to 145 $\mu$m shown in FIG. 17, so that it is desirable to gain a remarkably great amount of gripping force in comparison with that of the prior art.

Figure 18:
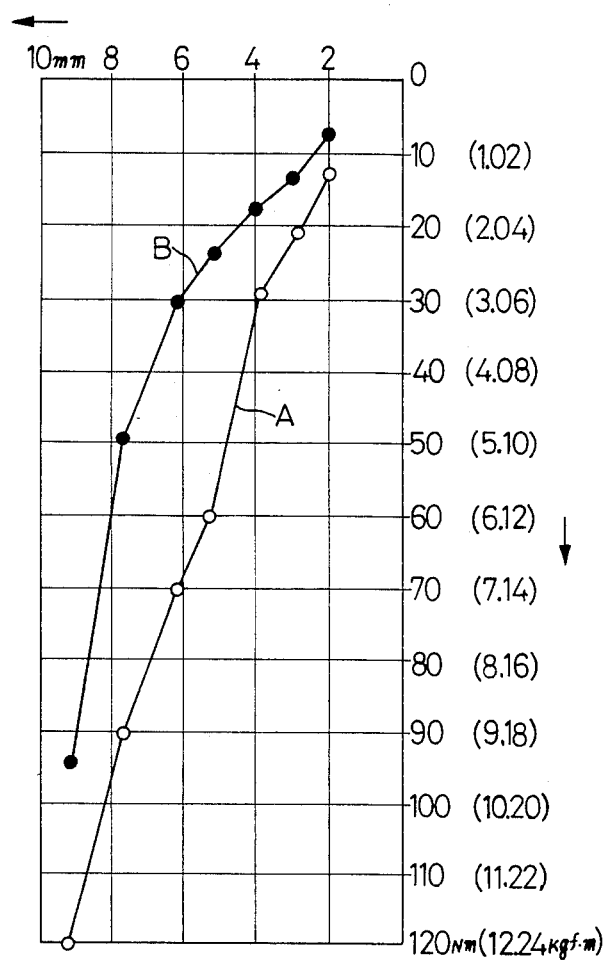
FIG. 18 is a graph showing the comparison of gripping torque between the above same ones.
Figure 19:
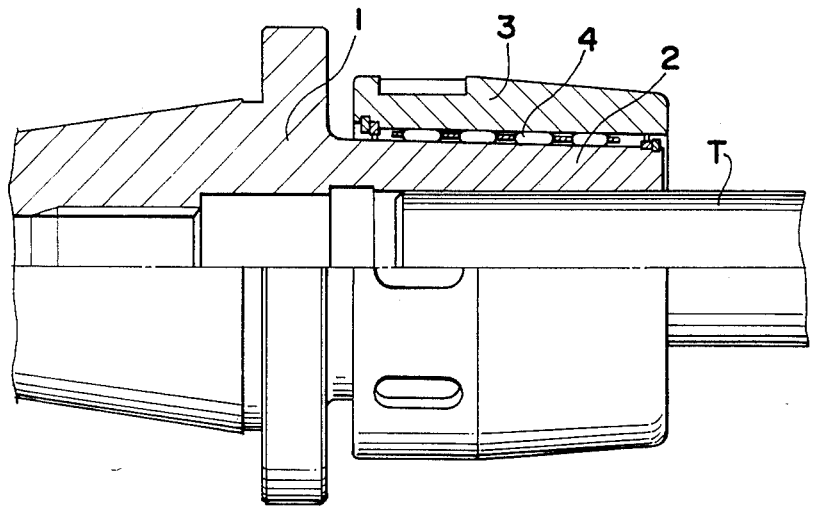
FIGS. 19 and 20 are partial longitudinal sectional views illustrating the prior art chucks.

FIG. 18 is a graph showing the comparison of gripping torque in the top end part of the chuck cylinder A according to the present invention to that of the chuck cylinder B according to the prior art, wherein the respective chuck cylinders grip cutting tools directly. The graph, which is drawn up on the base of measured values, indicates that the discrepancy between the gripping forces of the respective chuck cylinders A, B is about 4N·m (0.408 kgf·m) at the axial position of 2 mm from the top end face thereof, about 12N·m (1.224 kgf·m) at the position of 4 mm, about 40N·m (4.08 kgf·m) at the position of 6 mm. From the preceedings, it is understood that the embodiment A of the present invention effect to apply great gripping force to the top end part (from top end face up to axial inward position) of the chuck cylinder in comparison with the one of the prior art.

What is claimed is:

1. A chuck comprising:
   a chuck body;
   a chuck cylinder for gripping a straight shank of a cutting tool directly or through a straight collet, which projects ahead from a one side of said chuck body in a mated fashion to each other and has a straight internal peripheral surface corresponding either to the straight shank of the cutting tool or to the straight collet as well as an external tapered peripheral surface;
   a tightening rotary sleeve having a tapered internal peripheral surface corresponding to said tapered external peripheral surface of the chuck cylinder so as to be fitted rotatably outside the chuck cylinder;
   a plurality of needle rollers being interposed between said rotary sleeve and said chuck cylinder in such a manner a to revolve spirally with relation to the external peripheral surface of the chuck cylinder;
   slits being configured substantially inwardly axially from a top end face of said chuck cylinder and radially at intervals around a top end part of the chuck cylinder while communicating with the internal and external peripheral surfaces which are opposite to one another.

2. A chuck as defined in claim 1, wherein said slits have an axial length that said needle rollers are not allowed to be prevented from moving due to being caught in the slits.

3. A chuck as defined in claim 1, wherein said slits are arranged on lines inclined by a desired angle with relation to the axis of the needle roller revolving spirally.

4. A chuck as defined in claim 1, wherein said slits are filled with means for sealing thereby interrupting the communication with the opposite peripheral surfaces of the chuck cylinder.

5. A chuck as defined in claim 4, wherein said means for sealing is made of soft elastic material.

6. A chuck as defined in claim 4, wherein said means for sealing includes a seal ring covering the external peripheral side of said slit.

7. A chuck as defined in claim 1, wherein said chuck cylinder is provided with axially extending chuck grooves at regular intervals thereof.

8. A chuck as defined in claim 7, wherein said chuck groove consists of a slot open to the internal peripheral surface of the chuck cylinder and a middle hole communicating with said slot parallel to the chuck axis.

9. A chuck as defined in claim 7, wherein said chuck groove is configured in a U-like sectional form.

10. A chuck as defined in claim 7, wherein said chuck groove is configured in a rectangle-like sectional form.

11. A chuck as defined in claim 7, wherein said chuck cylinder is provided with axial directed hollow holes in the middle of the thickness thereof as said chuck groove to be employed.

12. A chuck as defined in claim 1, wherein said chuck cylinder consists of two different members of an inner cylinder projecting from the chuck body in a mated fashion to each other, and an outer cylinder to be fitted on the external peripheral surface of said inner cylinder.

13. A chuck cylinder as difined in claim 1, wherein said chuck body is provided outside the tightening rotary sleeve with a restricting ring projecting ahead while needle rollers are interposed between said restricting ring and said rotary sleeve so as to revolve spirally and moved axially.

* * * * *